W. B. KIRKPATRICK.
APPARATUS FOR MANUFACTURING ICE.
APPLICATION FILED FEB. 9, 1915.
1,169,164.
Patented Jan. 25, 1916.
2 SHEETS—SHEET 2.
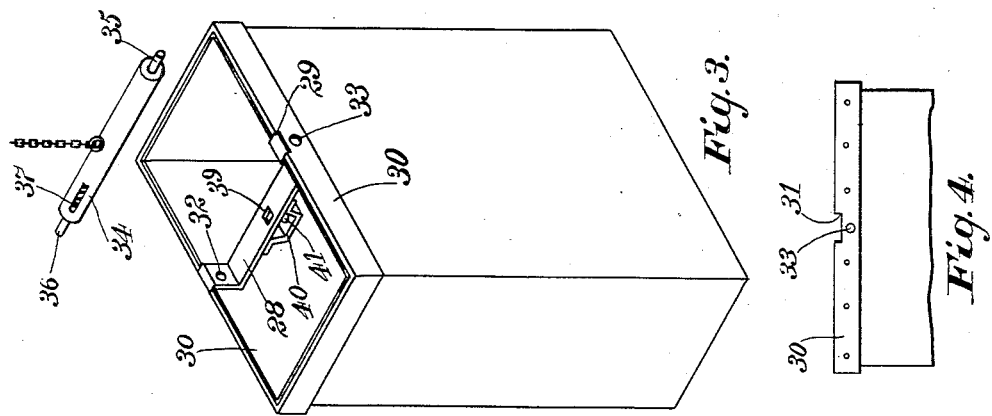
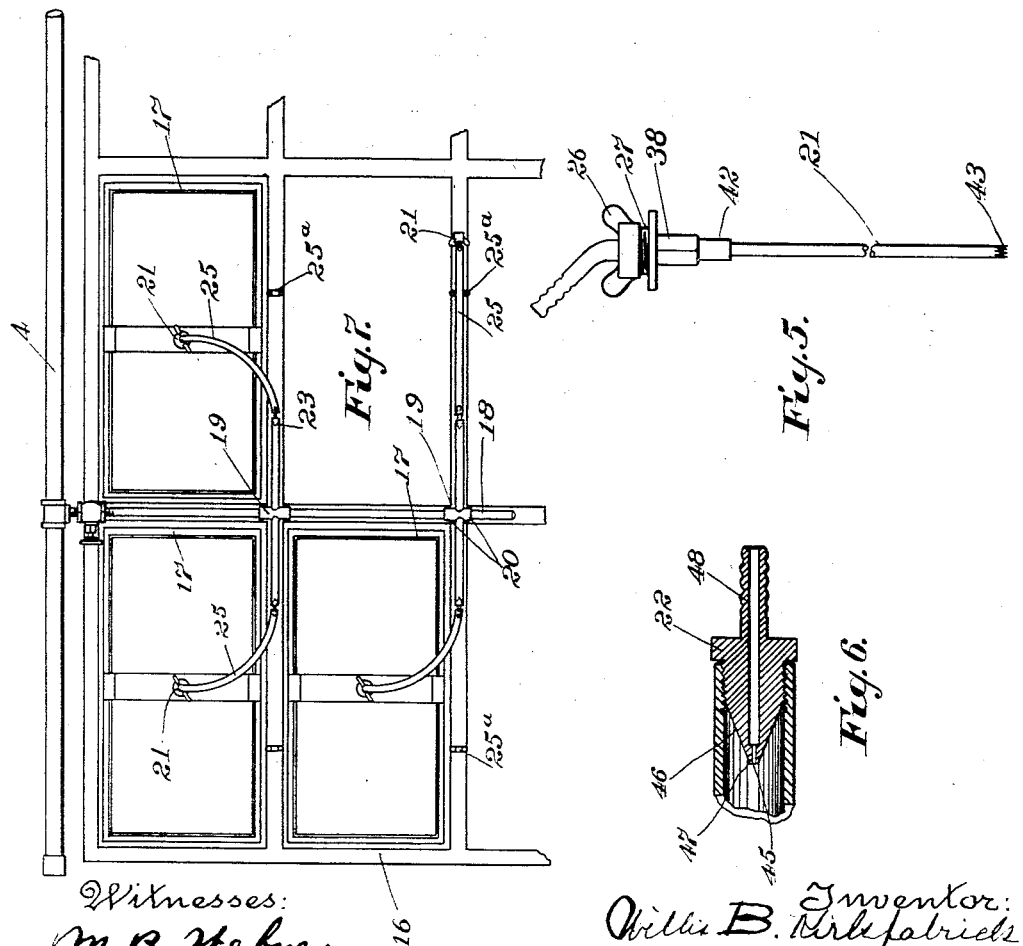

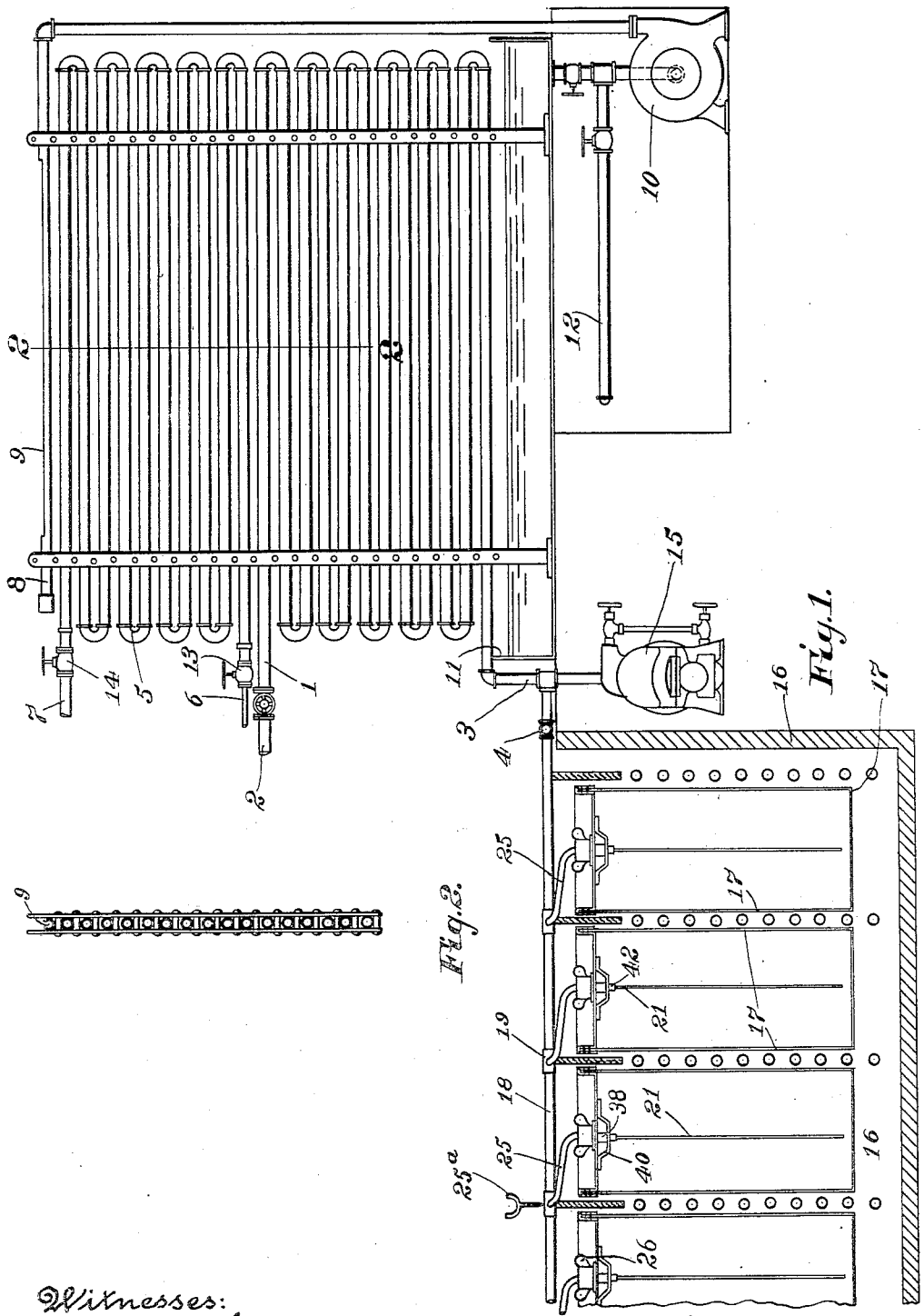

UNITED STATES PATENT OFFICE.

WILLIS B. KIRKPATRICK, OF BALTIMORE, MARYLAND, ASSIGNOR TO INDEPENDENT ICE COMPANY OF BALTIMORE CITY, OF BALTIMORE, MARYLAND, A CORPORATION OF MARYLAND.

APPARATUS FOR MANUFACTURING ICE.

1,169,164.   Specification of Letters Patent.   Patented Jan. 25, 1916.

Application filed February 9, 1915. Serial No. 6,987.

*To all whom it may concern:*

Be it known that I, WILLIS B. KIRKPATRICK, a citizen of the United States of America, residing in the city of Baltimore, State of Maryland, have invented certain new and useful Improvements in Apparatus for Manufacturing Ice, of which the following is a specification.

This invention relates to a method and apparatus for manufacturing raw water can ice. Until recently the water used in the manufacture of can ice has been distilled and this was the only known method of manufacturing can ice clear enough to be merchantable. But the distillation of water is very expensive and the ice made from distilled water is objectionable because the suspended matter in the water decomposes when it is heated and forms gases which are given off and condensed with the steam and when the distilled water is frozen, these gases together with the salts and other impurities in the water are concentrated at the center and form a white core which is offensive as to its taste and odor and objectionable as to its appearance.

It has been known for some time that agitation of the water by means of an air current while freezing will so influence crystallization as to form clear ice, but until recently this process has not been commercially successful because the introduction of air could not be kept up for more than approximately half the period of freezing and when the agitation was stopped, white ice was formed. In the last few years this method of making ice has been so far developed that under favorable circumstances, clear ice is produced from raw water, and the manufacture of ice from distilled water is being discontinued in favor of the manufacture of raw water ice by the aeration method.

The principal difficulty encountered is that incident to maintaining an uninterrupted flow of air until the formation of the cake of ice has been substantially completed. The main source of interruption of the air current is due to the formation of ice at three points. First, in the tube which leads the air to the point at which it is released; this is due to the condensation of moisture owing to the reduction in temperature in the pipe. Second, the formation of ice in the can so that it closes the mouth of the tube or the orifice through which the air is introduced. Third, by the formation of frost in the cooling pipes, particularly in the high pressure system. A fourth source of interruption is due to the deposit of scales of rust, sediment or other foreign matter over the small orifices through which the air is passed in bringing it to the pressure at which it is delivered to the can.

There are at present two different types of apparatus or methods of aerating water in the manufacture of ice. These may be termed high and low pressure processes. In the practice of the high pressure process, the air is first compressed to a comparatively high degree, as fifty or sixty pounds to the square inch. To reduce the temperature incident to this compression and also to effect dehydration and prevent as far as possible the deposit of frost in the tube by which the air is delivered to the can and in which it is cooled to a considerable extent, the compressed air is cooled to near the freezing point and again permitted to expand to a pressure from eighteen to twenty-five pounds, the high pressure being used to get excessive dehydration. After the pressure has been reduced as described, the air is led through a small orifice dropping the pressure to the vicinity of and but slightly above atmosphere, and then led to a pipe in the corner of the can or otherwise in contact with or in close proximity to the brine. This leads to the bottom of the can near the center where the air is released. In reducing the pressure from twenty-five to two pounds in the system in use, the air is passed through an automatic valve so arranged that when clogging of the pipe or stoppage of the outlet orifice through which the air is released in the can takes place, the pressure at the point of release in the pipe leading thereto is increased from two pounds to the pressure of the air supply at eighteen to twenty-five pounds, and the obstruction thus removed. As soon as this takes place, the automatic valve, when operative, is seated and the pressure returns to normal.

The difficulties encountered with this apparatus are that the automatic valve which must be produced in duplicate for each can, becomes stuck and the small orifice through which the air passes becomes clogged with scale and other matter. When the passage of air is interrupted as it must be when the apparatus fails in this way, the formation of clear ice ceases immediately and the formation of white ice goes on until the end of the freeze or until the air passage is opened. When the automatic valve opens to increase the pressure as described, sediment is apt to adhere to the seat and keep the valve from closing in which case the higher pressure will continue, backing the water up against the sides of the can and spoiling the cake. Incidentally, the loss of air in this way interferes with the operation of the system and injures or destroys the remainder of the ice. Also, the compression of the air at fifty or sixty pounds, which is an incident to this process, is exceedingly expensive.

The principal objection to the low pressure method in which the pressure is only sufficient to keep the water in agitation and which is less expensive, is that there is no means for opening the air-releasing orifice after it has once become frozen. As this takes place very early in the freeze, there is a large core or white ice in each block; otherwise, the center must be pumped out and filled with distilled water.

The present invention relates to a method and apparatus by means of which the high and low pressure systems are so combined as to obtain the advantages and overcome the prominent defects incident to each. To this end, I have evolved a new method and means for cooling the air, so arranged that closure of the cooling pipes by means of frost, which is one of the difficulties of the high pressure system, is wholly impossible, and in connection with this cooling means, I provide means for delivering the air to the bottom of the cans so arranged that the air in the delivery pipe is not cooled below the freezing point until the cake of ice is practically finished. This reduces to a large extent, the formation of frost in the delivery pipe and renders the excessive dehydration practised in the high pressure system unnecessary for it will be understood that the high pressures used are for the purpose of precipitating as much moisture as possible from the air to overcome in a different way the various difficulties to which I have referred. It will be noted however, that the high pressure system has always been used in connection with the delivery pipe which passes in close proximity to the brine the temperature of which is usually 14° F., whereas the delivery pipe in the present instance occupies the very center of the body of water to be frozen so that it does not come in contact with temperatures sufficiently low to precipitate and freeze the moisture in the air, until the formation of the cake is complete. By thus avoiding the necessity for excessive dehydration and providing a cooling means which cannot clog, and by other features hereinafter referred to, I have reduced the expense incident to compressing the air and increased the efficiency of the operation.

The throttling orifice having a conical or pointed surface surrounding the inlet to prevent closing of this minute orifice by rust scale and the like, is important. I thus do away with all the objectionable features of an automatic valve and at the same time get the same effect as the pressure will back up automatically through the restricted opening should the flow of air to the can be retarded.

Other features of the invention are found in the convenient arrangement of the whole apparatus for connecting and disconnecting the air pipes, removing the yoke, etc.

In the accompanying drawings, I have illustrated so much of an apparatus for aerating water in the manufacture of ice, and of other portions of an ice plant, as is necessary to a complete understanding of my invention.

Figure 1 is a vertical section of a portion of a brine tank showing a number of cans in section and the drop pipes and supply pipes in elevation; also the air cooling device in elevation; Fig. 2 is a section on the line 2, 2 of Fig. 1, showing the cooler in cross-section; Fig. 3 is a perspective view of one of the cans with the drop pipe support; also showing a yoke and a portion of a chain leading to the traveling crane used in moving the cans from the brine tank to the point where they are relieved of the ice; Fig. 4 is a fragmentary showing of the top of a can; Fig. 5 shows a drop pipe and coupling with the rubber connection; Fig. 6 is a fragmentary cross-section of the end of a cross-fitting showing a reducing orifice arranged according to my invention; and Fig. 7 is a plan showing the cans and connections.

Referring to the drawings by numerals each of which is used to indicate the same or similar parts in the different figures, the apparatus as shown includes a cooling coil 1 having an inlet 2 to which air is supplied at a medium pressure, preferably from twelve to twenty-five pounds above atmosphere, and an outlet 3 to the header 4 of the pipe system, by means of which the air for aerating the water is delivered to the cans. The cooling apparatus also includes an ammonia coil 5, the helices of the ammonia coil being arranged in a vertical plane as are those of the air coil, the latter being placed directly under the former, as shown in cross-section in Fig. 2, so that all the pipes of each cooling unit are in a single vertical plane. The inlet 6 of the ammonia coil is at the bottom, and the outlet 7 at the top. Just over the ammonia coil, I provide a water delivery pipe 8 which is preferably slotted throughout its entire length as at 9 or otherwise provided with suitable orifices to discharge water and permit it to flow uniformly over the entire coil. Water is supplied to the delivery or sprinkler pipe 8 by a pump 10 or other suitable and convenient means, either taking the water from the catch basin 11 beneath the coils or from an outside source by way of the pipe 12.

An important feature of the cooling system resides in the use of pure water instead of brine or the equivalent as a cooling medium in connection with the ammonia and air coils, and of valves, either automatically or manually operated at 13 and 14 by means of which on the appearance of ice on the ammonia pipes, the pressure and expansion of the ammonia vapor may be so regulated as to give the desired temperature and prevent further formation of ice, but even in the absence of such regulation of the pressure of the ammonia vapor, the air pipes cannot be cooled below freezing because the cooling effect is transferred from the ammonia pipes to the air pipes by means of fresh water, flowing in a film by gravity from the ammonia to the air pipes, and this flow could not of course be maintained at freezing temperatures. Substantially pure water having the same freezing point as pure water may be used with the same result and where the pressure of the ammonia vapor is reliably regulated, any other transfer medium is available.

As I have stated, the air passes through the cooling coil at a medium pressure which may be varied from twelve to twenty-five pounds above the atmosphere, but at this pressure with average humidity, a considerable amount of condensation takes place and the moisture thus condensed may be removed by a suitable trap or drip of commercial variety, shown at 15.

In Fig. 1 at the left, and in Fig. 7, I have shown a portion of a brine tank 16 of the type commonly used in the manufacture of block or can ice, together with a number of the cans 17 in operative position for freezing. The area occupied by the tanks is traversed by headers, as 4, leading from the cooler beyond the drip 15. Leading from the header 4 between each two lines of cans, in the form of the invention shown, is a lateral 18, and inserted in each lateral adjacent each pair of cans is a four-way fitting or cross 19. Two arms 20 of each cross are in alinement with the lateral, the other two arms preferably extending along the sides of the cans to a point adjacent the center and the air is led by suitable means from the end of the cross to the drop pipe 21, which is in the center of the can, which means in the form of the invention shown, consist of an apertured closure or plug 22 placed in the end 23 of each side arm 24 of the cross. To this plug a flexible tube 25 is connected. This tube is provided with a quick coupler 26 having a suitable connection 27 to the upper end of the drop pipe 21. At 25ª I have shown a bracket to hold the end of the tube 25 when disconnected or it may be merely laid along the frame 16.

A convenient means for supporting the drop pipe is shown in the form of a member 28 known as a drop pipe support, bent in the form of an inverted U and having hooked ends 29 which take over the long sides 30 of the cans at a point near their centers where these edges are notched as shown at 31 to position the support. The upright legs of the U are apertured at 32 and the sides of the can are correspondingly apertured at 33, the positioning notches 31 being for the purpose of bringing the apertures in alinement so that the yoke 34 of the usual type having a fixed pin 35 and a sliding pin 36 controlled by a trigger 37, may be conveniently attached, the pins 35 and 36 engaging the holes 32 and 33, for the purpose of drawing the can and carrying it to the place of discharge by means of the usual traveling crane. This can be done without removing the drop pipe, the coupler 26 merely being disconnected for this purpose.

In order that the drop pipe may be rigidly supported and held against rotation for engagement by the coupler, the support is provided at its center with a square opening 39 and the drop pipe is provided with a corresponding square shoulder 38 which fits into the opening in the support bringing the drop pipe at the center of the can, and beneath the square opening in the support, I provide a looped metal strap 40 having a circular aperture 41 to receive the circular portion 42 of the shank of the drop pipe.

To reduce the difficulty resulting from the closure of the end of the pipe by freezing which usually occurs, I have formed the lower end of the drop pipe with serrations or teeth 43. The ice tends to form in a cup shape over the exposed end of the pipe, adhering to the rim of the opening. The serrated edge presents less surface for adhesion of ice and offers a path for escape of air after it has formed and become attached to the pipe.

An important feature of the apparatus by means of which the air is delivered from the cooler to the can is found in the reducing or throttling member 22. One of the principal difficulties encountered in connection with the high pressure systems in use, results from the stoppage of the reducing orifice and the automatic valve used in connection with it for increasing the air pressure when obstruction takes place in the delivery end of the system. Usually the reducing orifice has been placed within the depression of the valve seat or otherwise so arranged that it was liable to become clogged by accumulation of rust scale, sediment and the like. Also the moving valve member itself was subject to freezing and clogging by other means and more than this, particles of rust, etc., became lodged on the seat when the valve was open so that it did not close, the water was displaced, the can exhausted, the operation of the whole system upset and the ice spoiled. To overcome these various difficulties, I have provided a reducing orifice 45 surrounded by a conical or otherwise pointed surface 46 and situated at the apex 47 of the cone or point so that there is no exposed, cupped or even flat surface in the vicinity of the opening to provide for the lodgment of foreign matter which might clog the opening. This device has been tested and found to be uniformly effective as an element of a constantly operative system where the corresponding element of the other apparatus in use, tested in the same plant, has failed frequently from clogging of the orifice and sticking of the automatic valve in both open and closed positions, resulting in continual losses of considerable magnitude. It will be understood that the orifice 45 may extend a short distance from the apex of the cone, the air passage as continued through the fitting or plug being of considerably larger cross-section and provided at the opposite end with a suitable connection as a nipple 48 to which the tube 25 or other means of leading the air to the drop pipe is connected.

The operation of the system will be described in connection with the process of my invention. Starting with the cans filled with water and the drop pipes in position in the centers of the cans, as shown in Figs. 1 and 7, the connections being made from each cross fitting 19 to the corresponding drop pipes 21 by means of the hose or flexible tube 25, ammonia is supplied to the coil 5 by way of the inlet 6, air at medium pressure, determined as sufficient to keep the air passage open around the pipe 21 until freezing is complete, is supplied to the coil 1 by way of the inlet 2, and fresh water is passed over the ammonia and air pipes as indicated. The temperature of the air pipes is controlled and kept above freezing by controlling the pressure of the ammonia vapor, or by using clear water as a heat transfer medium, the fresh water used as a medium for this transfer serving to prevent the reduction of the temperature of the air to an extent sufficient to cause frost in the pipes. The water which may be condensed by this drop in pressure, the quantity depending upon the humidity of the air, there being none under some conditions, is removed from the drip 15 and the cool air is delivered to the header 4 whence it passes to the laterals 18 being distributed from the laterals by way of the crosses 19 and drop pipes 21.

It will be understood that the initial pressure at the inlet 2 is substantially maintained throughout the system as far as the reducing orifices 45. At this point the air is expanded and throttled down to about two pounds for the higher pressure would interfere with freezing and would blow the water from the cans. The plugs 22 with the pointed surface 46 and the reduced orifice 45 at the apex, as I have pointed out, are effective to prevent clogging at this point under any and all conditions, and the placing of the drop pipes centrally of the cans prevents them from being subject to freezing temperatures until the formation of the ice cake is well advanced. Even then the ice formation at the center takes place from the bottom up and the freezing temperatures first occur at the mouth of the drop pipe.

To keep the orifice from being closed by the ice formed in the can in the regular process of freezing a block the full initial pressure provided is sometimes necessary and the benefit of this is obtained in a simple and effective manner without the use of an automatic valve, for while the orifice 45 is effective to reduce the air pressure to two pounds when the air is escaping from the drop pipe, this reduction does not take place when the drop pipe is stopped up and under these circumstances, the pressure gradually builds up from two pounds until the obstruction is overcome or until it equals the initial pressure at the air inlet 2.

In practice it is found that with twelve or fifteen pounds at the air inlet, the drop pipe, constructed as described and supplied with air by means of my apparatus, will keep open until ice is formed up to the outer walls of the pipe 21 so that a cake or block of ice which is clear at the very center is produced. While some slight obstructions take place, these are quickly broken by the rise of air pressure described.

The remainder of the operation is easily understood. When freezing is complete, the couplers 26 are disconnected and the tubes 25 laid on the adjacent portion of the frame, preferably being rested in the bracket 25ᵃ. Next, the yoke 34 is lowered into position, the pins 35 and 36 being passed through the holes 32 and 33. By means of a traveling crane, the cakes are carried to a point where they are subject to a hot water spray and steam is introduced into the drop pipes. The pipes are then easily withdrawn, the supports removed and the cakes of ice delivered from the cans.

It will thus be apparent that by using in a system of this kind, a medium initial pressure with a drop pipe situated at the center of the can, I have rendered the use of high pressures to produce excessive dehydration unnecessary, for formation of frost in the drop pipe is practically eliminated. Thus a greatly increased economy resulting from the reduction of the initial pressure by about thirty pounds, is achieved.

By the use of a cooler for the compressed air so regulated as to prevent the formation of frost in combination with the features just referred to, I obtain a sufficient cooling effect and prevent the obstruction of the system where more extensive cooling to produce the necessary amount of dehydration was necessary in the previous systems. This also results in a very considerable economy.

By the use of the conical plug and orifice described, I prevent clogging by rust scale and other foreign matter, and by the combination of details for supporting the drop pipe, making connections and applying the yoke, I add to the convenience and hence cheapen the operation of the plant.

I have thus described the method and apparatus of my invention specifically and in detail in order that its operation may be clearly understood; however the specific terms herein are used in their descriptive rather than in their limiting sense and the scope of the invention is defined in the claims.

Claims—

1. In an apparatus for making can ice from raw water, means for agitating the water by aeration consisting of an air supply pipe, an air delivery pipe connected thereto, and means in the air passage thus formed for throttling the air in the form of a pointed member with a minute orifice at the point for the passage of the air.

2. In an apparatus for making can ice from raw water, means for agitating the water by aeration consisting of an air supply pipe, an air delivery pipe connected thereto and means in the air passage thus formed for throttling the air consisting of a member in the air passage for obstructing the flow of air, the said member having a small aperture for the passage of the air and an inclined surface sloping backward from said orifice to prevent the accumulation of foreign matter tending to close the orifice.

3. In an apparatus for making can ice from raw water, means for agitating the water by aeration consisting of an air pipe leading toward the cans and means for throttling the air consisting of a plug in the pipe having a pointed surface, the point being disposed in a direction opposing the air current and the plug having a minute orifice through which the air passes, the entrance to the orifice being located at the vertex or point.

4. In an apparatus for making can ice from raw water, means for agitating the water by aeration consisting of a supply of compressed air, an air passage for leading the air toward the cans, an obstruction in the air passage having a point extending backward in a direction contrary to the air current, the point having a minute orifice for the passage of the air.

5. In an apparatus for making can ice from raw water, means for agitating the water by aeration consisting of air supply pipe, an air delivery pipe, means connecting the two pipes, means in the air passage thus formed for reducing the pressure of the air for delivery, the same being in the form of an obstruction to the air passage, the said member having a minute aperture for the passage of air which normally serves as a means for reducing the delivery pressure but in case the air passage beyond the orifice becomes closed, permits the building up of the delivery pressure until it equals the supply pressure.

Signed by me at Baltimore, Maryland this 8th day of February, 1915.

WILLIS B. KIRKPATRICK.

Witnesses:
ZELLA KUHN,
E. G. DONEGAN.